Dec. 24, 1929.  H. J. WOODALL ET AL  1,740,489
AUTOMOBILE CLOSED BODY CONSTRUCTION
Filed Aug. 2, 1926

INVENTORS
HERBERT J. WOODALL
MEREDITH S. RANDALL
BY
Parker & Burton
ATTORNEY.

Patented Dec. 24, 1929

1,740,489

UNITED STATES PATENT OFFICE

HERBERT J. WOODALL AND MEREDITH S. RANDALL, OF DETROIT, MICHIGAN

AUTOMOBILE CLOSED-BODY CONSTRUCTION REISSUED

Application filed August 2, 1926. Serial No. 126,588.

Our invention relates to an improved wall panel assembly particularly designed for use in connection with the interior panels of closed automobile bodies.

The improved panel is so formed and constructed as to be readily fastened into place upon a provided frame and is of such a character that, when the panel is in place, the fastening means are concealed and protected and the covering material with which the panel is provided has its edges concealed and protected.

Panels of this character are commonly formed of cardboard covered with suitable upholstery material and our invention is shown as embodied in a panel of this type.

Various advantages and meritorious features of construction will more fully appear from the following specifications, appended claims, and accompanying drawing, in which:

Figure 1:
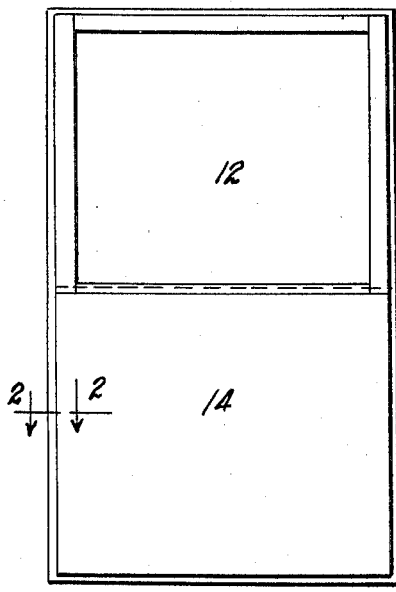
Fig. 1 is an interior elevation of an automobile door of conventional design provided with our improved panel construction.

For purposes of illustration we have shown our invention as embodied in a door panel assembly of the character employed in closed automobile bodies. The door is indicated in assembly as 10. It has a window opening 12 and our improved panel 14 positioned below such opening. A common type of door construction is to employ a metal structure having an outer wall 16 bent as at 18, 20, 22, 24 and 26, into the frame shown in Figs. 2 and 4.

Our improved panel is preferably formed of cardboard covered upon one side with suitable upholstery material 28 which is secured thereto along the margin of the panel by being glued or otherwise fastened in place. The marginal portion of the panel to which the covering material is secured is folded over as at 30 and is here shown as stitched in place as at 32, thereby concealing and protecting the edge of the covering material and its point of attachment to the panel. In the construction shown in Figs. 2 and 4, the marginal portions of the panel indicated have been folded over before the covering material was fastened down. The construction of the panel as a separate article of commerce in various forms is illustrated more fully in a copending application this date filed.

This particular application relates to the securing of the panel in place upon its supporting frame. We provide a plurality of fasteners here shown in the form of stud bolts 34 carried by the portion 22 of the frame and secured thereon by a nut 36. Heads 38 are provided upon the opposite ends of these bolts 34.

The marginal portion of the panel is provided with a plurality of spaced apart keyhole openings 40 adapted to be received over the heads 38 of the bolts 34 and having reduced ends adapted when engaged therewith to hold the panel in place.

Figure 4:
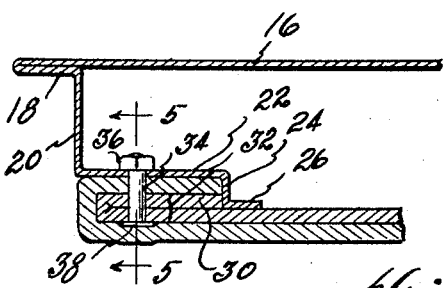
Fig. 4 is a cross-sectional view taken on the same line as Fig. 2 showing a modified form of contruction.
Figure 6:
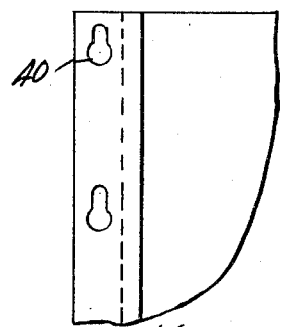
Fig. 6 is an elevation of a fragment of one form of our panel structure.
Figure 5:
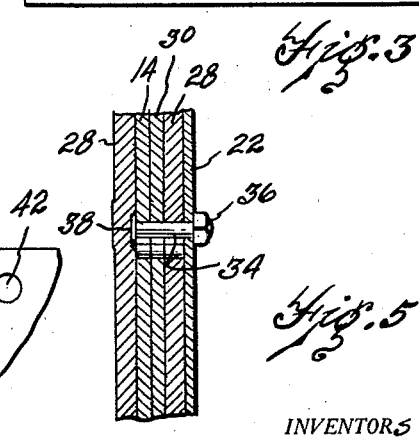
Fig. 5 is a cross-sectional view taken on line 5—5 of Fig. 4.

In Figs. 4, 5, and 6, we have shown these keyhole openings as extending entirely through the cardboard panel structure. The bolts are provided with relatively thin heads which are concealed by the covering material of the panel.

Figure 2:
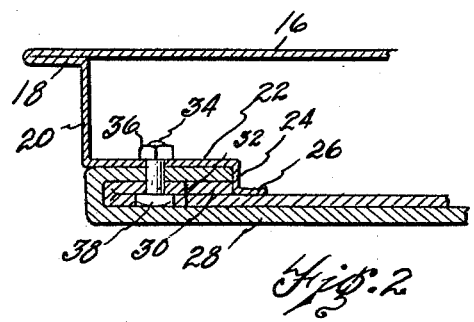
Fig. 2 is a cross-sectional view taken on line 2—2 of Fig. 1.
Figure 3:
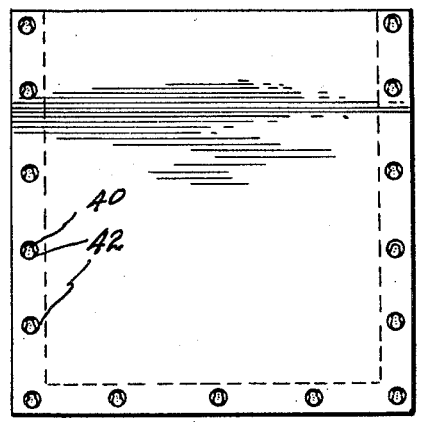
Fig. 3 is an elevation of the panel.
Figure 7:
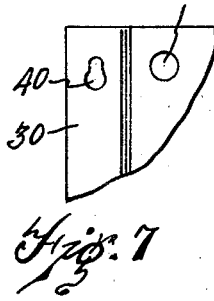
Fig. 7 is an elevation of a fragment of a modified form of our panel structure.

In Figs. 2, 3, and 7, we have shown the keyhole openings as extending through the marginal portion 30 of the panel but not through the outer adjacent portion of the panel. This construction is particularly illustrated in Fig. 7 wherein keyhole opening 40 is shown as located in the marginal portion 30 and the outer portion of the panel proper is shown as provided with an opening 42 disposed opposite the reduced end of the keyhole opening, which opening 42 is of sufficient size to receive the head of the fastener as shown in Fig. 2. In this construction the head of the fastener is seated below the outer surface of the cardboard panel and its location is not visible through the covering material.

We claim:

In body construction, a substantially rectangular wall frame having a continuous marginal recess extending about three edges, a wall panel adapted to fit said frame having a marginal fold along three edges adapted to seat within said recess, said frame provided with a plurality of outwardly projecting headed studs located at intervals within said recess, said marginal fold of the panel provided with a plurality of keyhole apertures located at intervals corresponding to the studs of the frame and adapted at their large ends to receive therethrough the heads of the studs, said heads being adapted to engage the margins of the small ends of the apertures, said panel provided with a plurality of apertures arranged at intervals about the edges provided with the fold, said apertures so arranged that one is positioned opposite the small end of each keyhole aperture through the fold and is of a size to receive and embrace the head of the stud extending through said keyhole aperture.

In testimony whereof, we sign this specification.

HERBERT J. WOODALL.
MEREDITH S. RANDALL.